S. S. CHILDS.
TIRE.
APPLICATION FILED MAR. 12, 1909.
929,122.
Patented July 27, 1909.
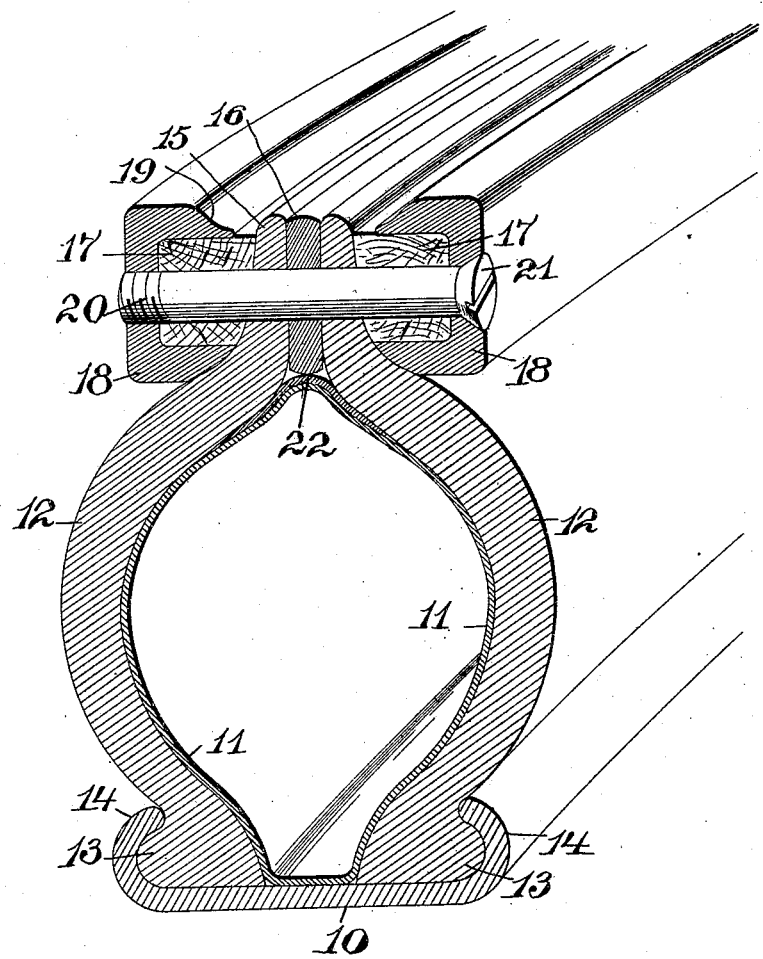
WITNESSES:
E. A. Pell
M. A. Johnson
INVENTOR
Samuel S. Childs,
BY
Wm H Caufield.
ATTORNEYS

UNITED STATES PATENT OFFICE.

SAMUEL S. CHILDS, OF BERNARDSVILLE, NEW JERSEY.

TIRE.

No. 929,122.  Specification of Letters Patent.  Patented July 27, 1909.

Application filed March 12, 1909. Serial No. 482,886.

*To all whom it may concern:*

Be it known that I, SAMUEL S. CHILDS, a citizen of the United States, residing at Bernardsville, in the county of Somerset and State of New Jersey, have invented certain new and useful Improvements in Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.
This invention relates to an improved tire that forms a wide tread, which tread is adapted to form a non-skidding surface and also form a tread that is not puncturable. The tire, however, does not lose any of its resiliency, being pneumatic, and it has the added feature of being formed from an old tire, or else it can be formed as hereindescribed when made new. The surface of the tire, when completed, forms a series of annular ridges and grooves intended to minimize the transverse slipping or skidding of a tire.

The invention is illustrated in the accompanying drawing, in which the figure is a sectional perspective view of a tire made according to my improved construction.

The tire is formed of any usual form of rim 10, which rim is attached to the wheel in any of the ordinary ways, and the tire has an inner tube 11 which is inclosed in a shoe formed of two halves 12, which halves are secured to the rim 10 in any well known way, but usually by the projecting portions 13 confined in the turned or clenching edges 14 of the rim. The two halves or members making up the shoe are formed as shown in the illustration when they are made, or an old shoe can be cut and tapered and then formed into the two parallel projecting lips 15, between the opposed faces of which is secured a ring 16, which ring is preferably made of steel, although any metal or similar material can be used. The ring is a flat ring, preferably made with a rounded periphery and the lips 15 flank the ring and fit up tight against it.
Outside of the lips 15, one on each side of the tire, are the rings 17 smaller in diameter than the lips and preferably made of wood, these wooden rings each being inclosed in a circular channeled strip 18 which is arranged on the outer side of each ring on each side of the tire and is beveled or cut away, as at 19, on its inner edge so as to form a groove between the circular channeled strip and the lips 15 and the ring 16.

Screws 20 are set at intervals around the tire and passed through the circular channeled strips and through the wooden rings and the lips and the flat ring so as to bind all the parts tightly together. The screws each have a countersunk head 21 which fits flush with the surface of an annular channeled strip 18.

This device gives a grooved surface on the periphery of the tire, the grooves running circumferentially thereon, forming annular spaces, and being constantly in contact with the road to prevent skidding.

I prefer to place a shield 22 of leather or similar material to prevent any possibility of chafing the inner tube by the ring 16.

Having thus described my invention, what I claim is:—

1. A tire comprising a shoe split on its periphery and formed into substantially parallel lips, a ring between the lips, rings flanking the lips, circular channeled strips on the outside of the outer rings, and means for securing the lips the rings and the strips together, the peripheries of the elements being shaped to form annular grooves on the surface of the tire.

2. A tire comprising a shoe having lips arranged in parallel relation on its periphery, a flat ring between the lips having its periphery rounded, rings flanking the lips and of less diameter than the lips, a channeled strip on each outer ring, each channeled strip being cut away at its inner surface to form a groove between the strip and the lips, and means for securing the lips the rings and the strips together.

In testimony, that I claim the foregoing, I have hereunto set my hand this 10th day of March 1909.

SAMUEL S. CHILDS.

Witnesses:
E. A. PELL,
WM. H. CAMFIELD.